Nov. 29, 1966   A. H. SCHLEMMER, JR   3,287,932
SPRAY FREEZER TUNNEL
Filed July 16, 1965   4 Sheets-Sheet 1
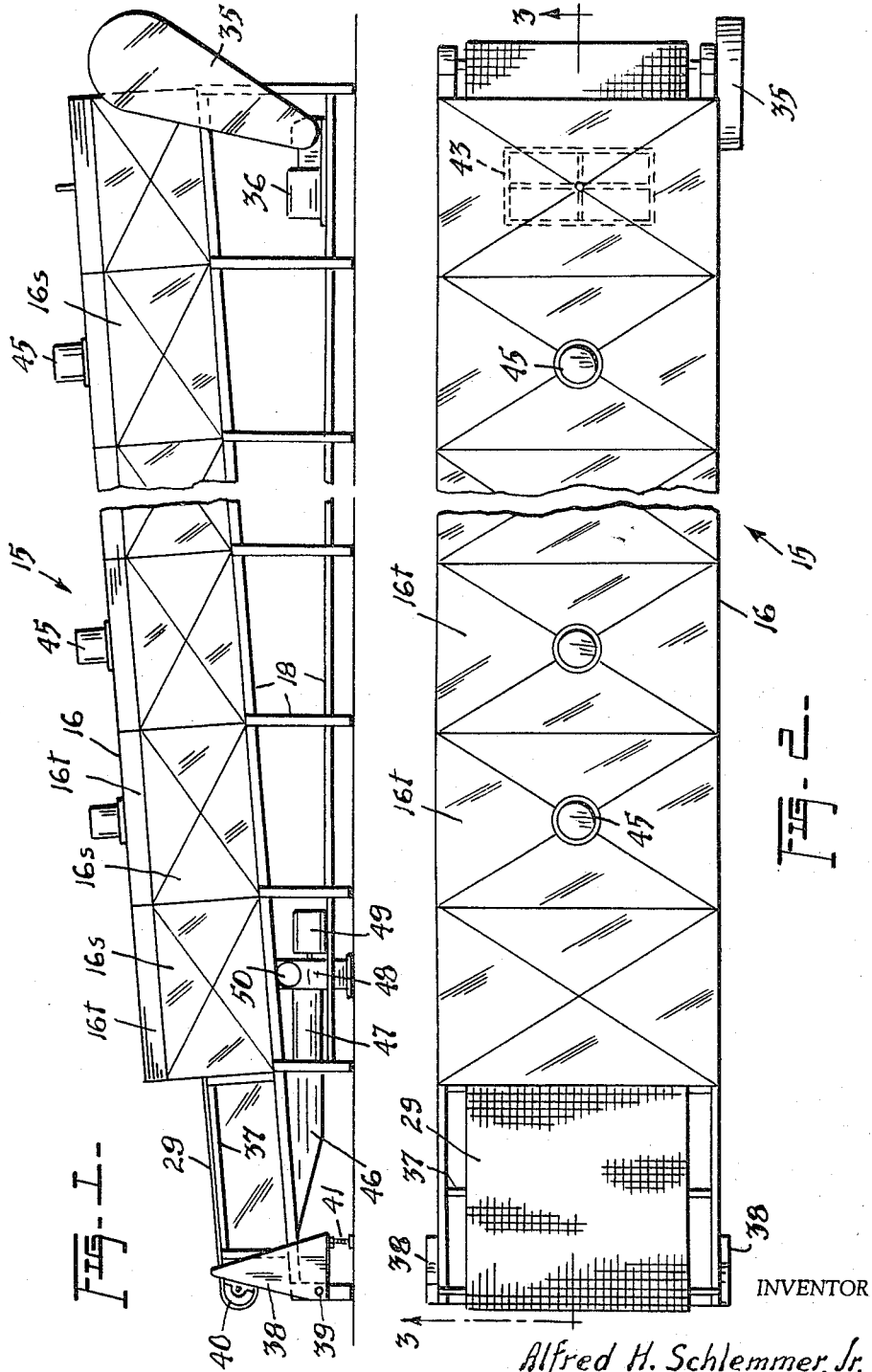
INVENTOR
Alfred H. Schlemmer, Jr.
BY Munson H. Lane
ATTORNEY

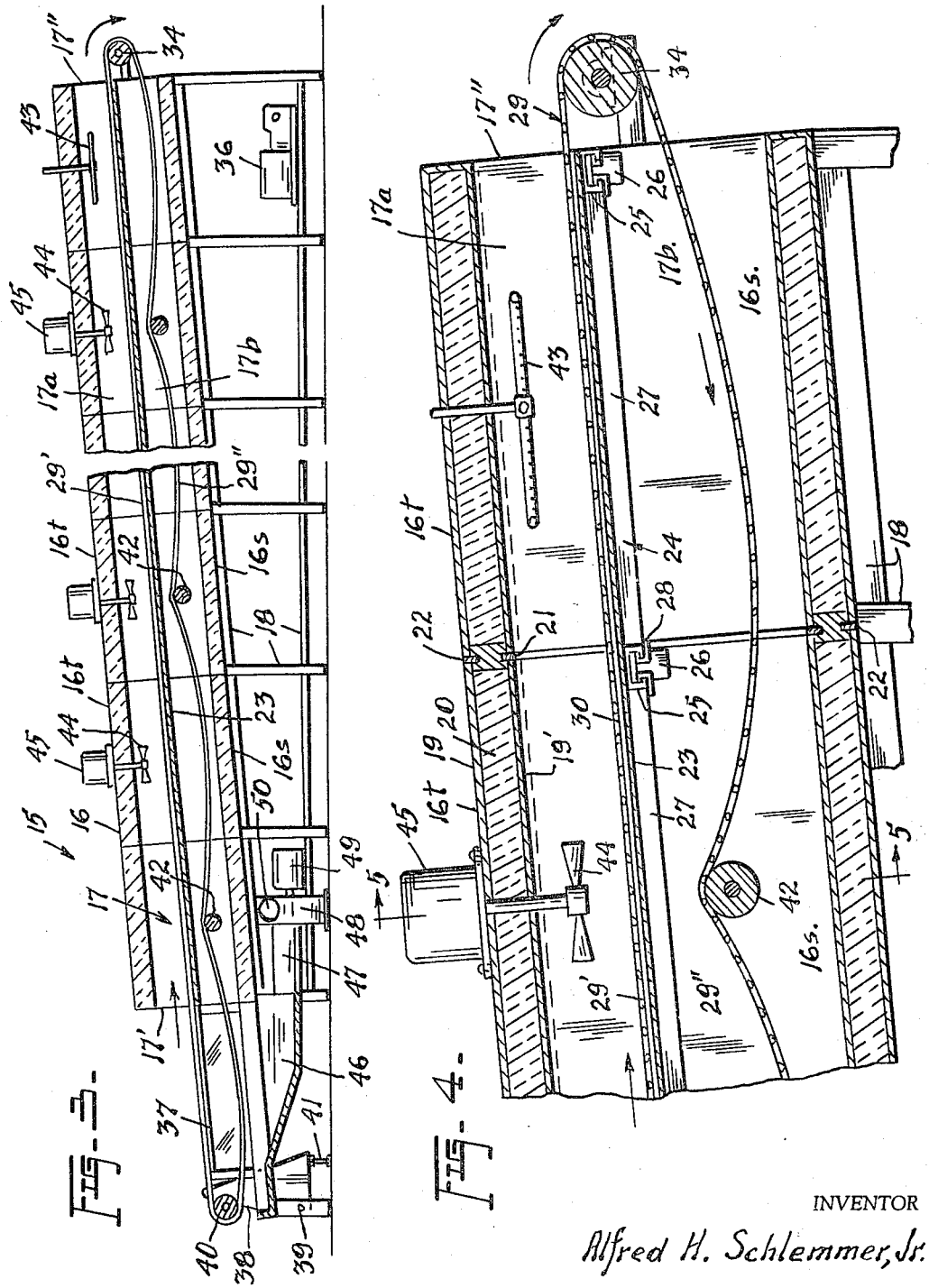

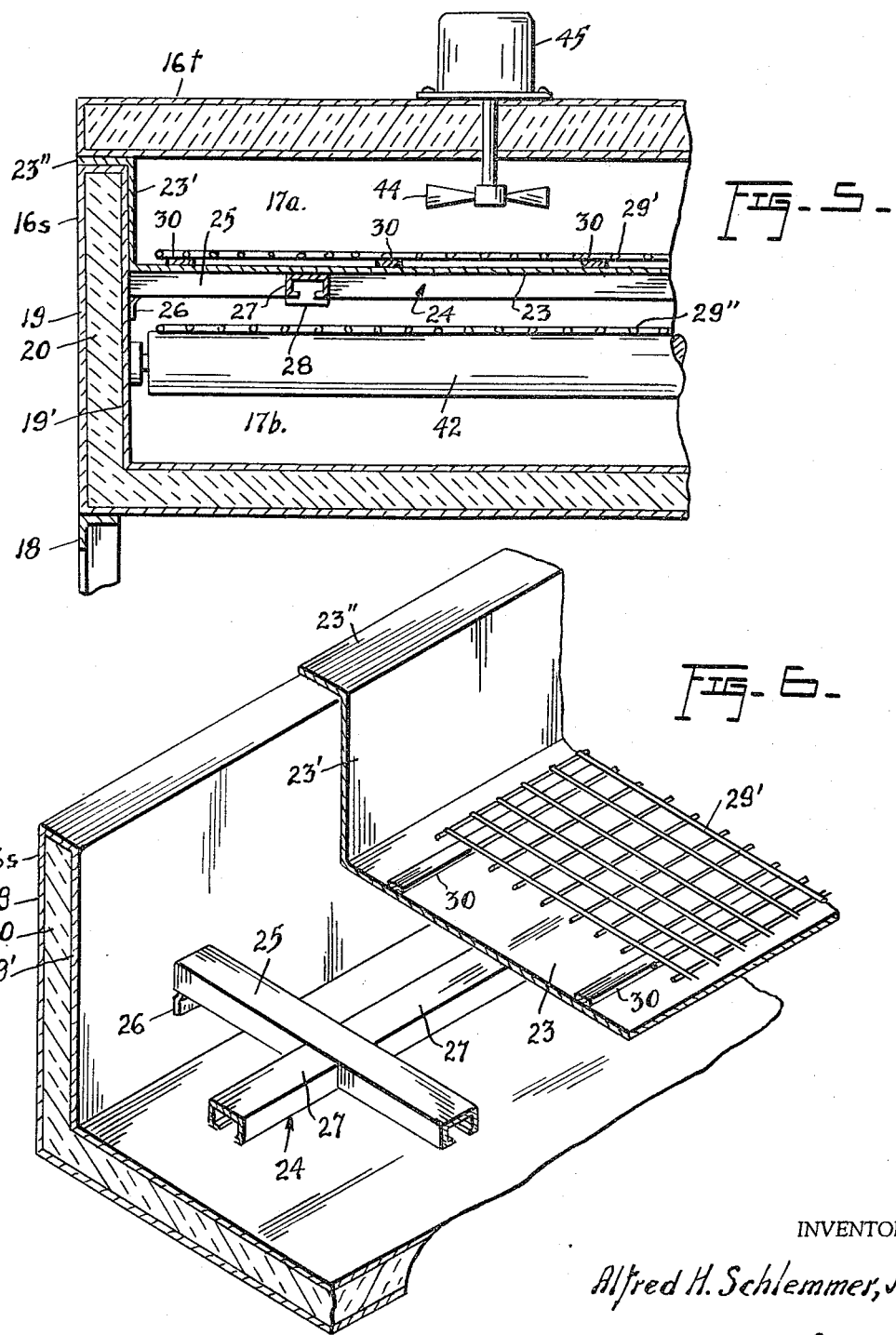

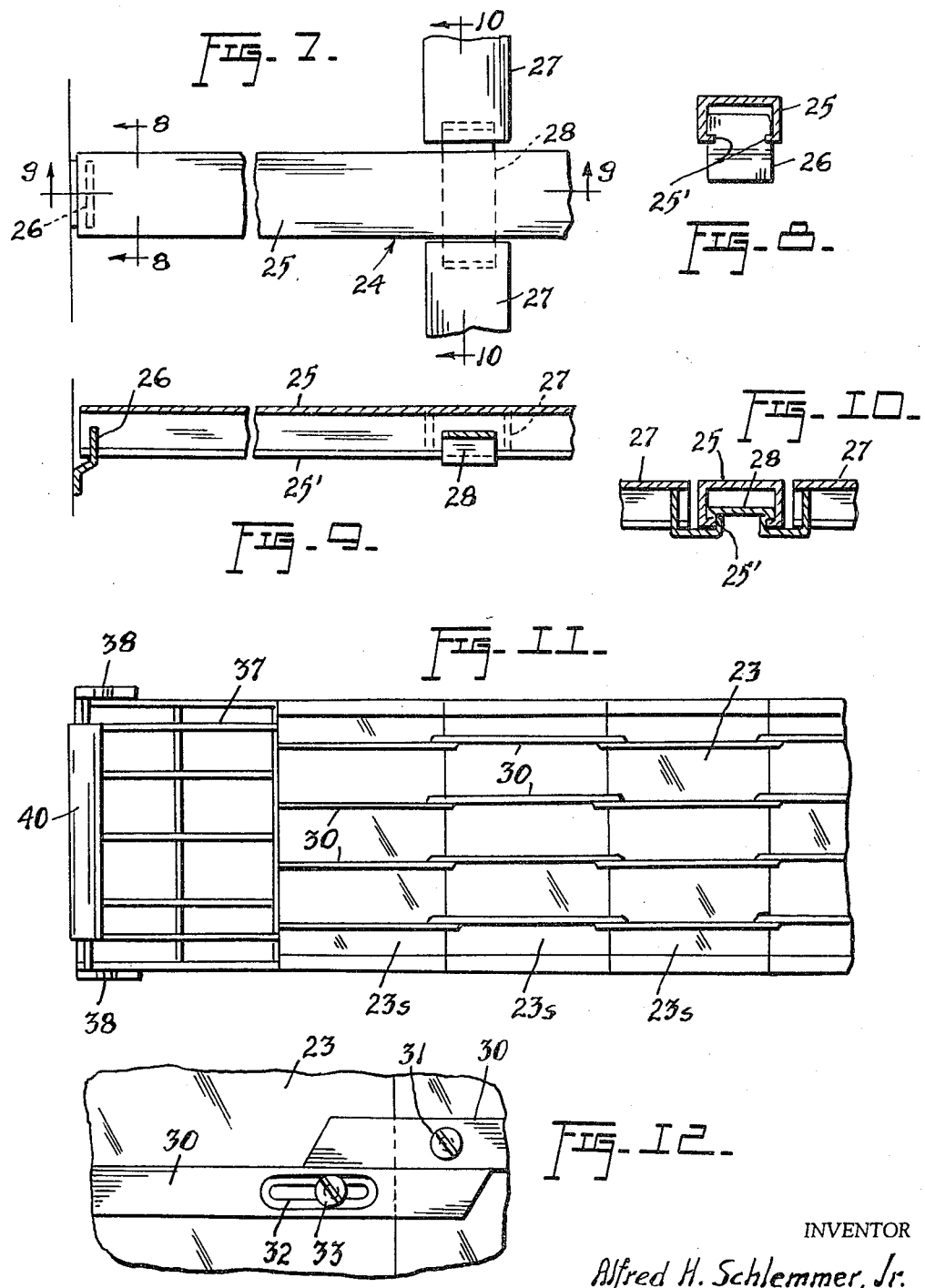

United States Patent Office 3,287,932
Patented Nov. 29, 1966

3,287,932
SPRAY FREEZER TUNNEL
Alfred H. Schlemmer, Jr., 400 N. Lake Eloise Drive, Winter Haven, Fla.
Filed July 16, 1965, Ser. No. 472,594
7 Claims. (Cl. 62—374)

This invention relates to new and useful improvements in apparatus for freezing food in a rapid manner by the use of a liquefied gas such as liquid nitrogen, for example.

Briefly, the apparatus of the invention comprises an elongated housing forming a tunnel through which passes a conveyor. The food to be frozen is deposited on the conveyor at one end of the tunnel and liquefied gas is discharged into the tunnel, the gas becoming volatilized and causing the food to freeze as it passes through the tunnel on the conveyor, the frozen food being discharged from the conveyor at the opposite end of the tunnel. As such, the food freezing operation is performed quickly and in a continuous fashion.

As a practical matter, the length of the tunnel may vary in accordance with different food freezing requirements, and it is therefore desirable to construct the tunnel from a plurality of modular sections, assembled in end-to-end relation to provide a tunnel of the desired length. One of the objects of the invention, therefore, is to provide a modular sectional tunnel arrangement together with means for appropriately sealing the joints between the adjacent tunnel sections in a sanitary manner so that particles of food, foreign matter, and the like, cannot accumulate in such joints.

Another important object of the invention is to provide, in an apparatus of the character described, a tunnel which is divided by a longitudinal partition into an upper compartment and a lower compartment, the aforementioned food conveyor having an upper, food conveying run which extends through the upper compartment along the partition, and a lower return run which extends through the lower compartment, the partition being imperforate and serving not only to support the upper run of the conveyor, but also to confine the liquid and volatizing gas in close proximity to the food which passes on the conveyor through the upper compartment for freezing purposes.

The temperatures encountered in the freezing operation are extremely low, being close to absolute zero, and various components of the apparatus are therefore subjected to considerable physical contraction and expansion between such times when the apparatus is in operation and when its operation is discontinued, as for example, for purposes of cleaning at periodic intervals. Thus, with the apparatus at very low operating temperature, its components may contract so as to produce spaces or crevices between their joints, in which spaces or crevices food particles may accumulate. Then, when the freezing operation is interrupted and the apparatus returns to ambient temperature, expansion of the components may close up the spaces or crevices and trap the accumulated food particles so that they cannot be dislodged by ordinary methods of cleaning. It is, therefore, a further object of the invention to provide a tunnel construction which is fully compatible with expansion and contraction under temperature changes and which prevents accumulation and trapping of food particles between component joints, whereby the tunnel may be properly cleaned and maintained in a sanitary condition.

Other objects, features and advantages of the invention will become apparent from the following description taken in conjunction with the accompanying drawings, wherein like characters of reference are used to designate like parts, and wherein:

FIGURE 1 is a side elevational view of the food freezing apparatus of the invention;

FIGURE 2 is a top plan view thereof;

FIGURE 3 is a longitudinal sectional view, taken substantially in the plane of the line 3—3 in FIGURE 2;

FIGURE 4 is an enlarged, fragmentary longitudinal sectional view showing the delivery or discharge end portion of the tunnel;

FIGURE 5 is a fragmentary cross-sectional detail, taken substantially in the plane of the line 5—5 in FIGURE 4;

FIGURE 6 is a fragmentary perspective view of the tunnel structure;

FIGURE 7 is a fragmentary, enlarged plan view showing the arrangement of the tunnel partition supporting framework;

FIGURE 8 is a sectional detail, taken substantially in the plane of the line 8—8 in FIGURE 7;

FIGURE 9 is a fragmentary sectional detail, taken substantially in the plane of the line 9—9 in FIGURE 7;

FIGURE 10 is a fragmentary sectional detail, taken substantially in the plane of the line 10—10 in FIGURE 7;

FIGURE 11 is a fragmentary plan view on a reduced scale, showing the loading end portion of the tunnel with the top thereof and the food conveyor removed; and FIGURE 12 is a fragmentary, enlarged plan view showing the conveyor wear strips on the tunnel partition.

Referring now to the accompanying drawings in detail, the food freezing apparatus of the invention is designated generally by the reference numeral 15 and embodies in its construction an elongated housing 16 of a rectangular cross-section, forming a tunnel 17. The tunnel has what may be called a loading end 17' and a discharge end 17" and the housing is supported by a suitable open-frame base 18 so that the tunnel is inclined from the loading end toward the discharge end thereof, as will be clearly apparent.

The tunnel forming housing 16 has double walls 19, 19' with suitable thermal insulation 20 therebetween and, in order that the tunnel may be of any desired length, it is preferable to construct the housing from a plurality of modular sections 16s which are assembled in end-to-end relationship. Each section 16s is U-shaped to form the sides and bottom of the tunnel, while a removable top 16t is provided on each section, as will be apparent from FIG. 5.

To prevent accumulation of food particles, foreign matter, et cetera, in joints between the abutting ends of the tunnel sections, Teflon sealing strips 21 are provided at the junction of the inside walls 19' and vinyl sealing strips 22 are similarly provided at the junction of the outside walls 19 as shown in FIG. 4, these sealing strips being completely watertight and preventing formation of cervices in which food particles or foreign matter could accumulate.

An imperforate partition 23 is provided longitudinally in the tunnel 17 and separates the same into an upper compartment 17a and a lower compartment 17b. The partition 23 may be also formed from a plurality of modular sections associated with the respective sections of the housing 16, such sections of the partition being indicated at 23s in FIG. 11.

The partition 23 is supported in the tunnel 17 by a lattice-type framework 24 which is especially constructed to allow for expansion and contraction under changes of temperature such as are encountered during cooling of the apparatus to its operating temperature and during warming thereof to the ambient temperature, as for example when the apparatus is shut down for purposes of cleaning. The lattice-type framework 24, shown in detail in FIGS. 5–10, comprises a set of cross members 25 extending between the sides of the tunnel, each cross member being in the form of an inverted channel with inturned flanges 25' at its lower edges, as will be apparent from FIG. 8. The end portions of the cross members 25 are slidably supported by brackets 26 secured to the sides of the tunnel, the length of the cross members being somewhat less than the transverse distance between the tunnel sides, so that clearance is provided for expansion and contraction of the cross members as already set forth. The frame-work 24 also includes a plurality of longitudinal members 27 of the same form as the cross members 25. The longitudinal members 27 extends between the cross members 25 and are supported by clips 28 carried by intermediate portions of the cross members. Here again, the longitudinal members 27 are shorter than the spacing between the cross members 25, so that clearance is provided to permit expansion and contraction of the longitudinal members.

The aforementioned partition 23 rests upon the lattice framework 24 and has upstanding side walls 23' provided at their upper edges with outturned flanges 23" which are interposed between the upper edges of the housing sections 16s and 16t, as shown in FIG. 5.

A food conveyor 29 passes through the tunnel 17, the conveyor preferably being in the form of an open mesh stainless steel belt and having an upper, food conveying run 29' and a lower return run 29". The upper run 29' of the conveyor passes through the upper compartment 17a of the tunnel along the partition 23 and to prevent the partition from being worn by the conveyor, a plurality of wear strips 30 are provided on the top surface of the partition so that the conveyor may run along such wear strips rather than on the partition itself.

As shown in FIG. 11, the wear strips 30 are arranged in sets on the respective partition sections 23s. To permit expansion and contraction of the wear strips under temperature changes, they are laterally staggered and longitudinally overlapped as shown. One end of each wear strip is fixedly secured to the partition as by a fastener 31, while the other end of the strip is formed with a slot 32 to slidably receive a fastener 33 as shown in FIG. 12, whereby expansion and contraction of each strip is facilitated independently of the next adjacent strip. Also, the side-by-side overlap of the adjacent strips prevents formation of crevices in which food particles or foreign matter could accumulate, so that the apparatus may be easily washed and kept in a sanitary condition.

At the outlet end 17" of the tunnel the conveyor 29 passes over a driving roll 34 driven through an enclosed belt or chain drive 35 by a suitable motor 36 on the base 18. At the loading end 17' of the tunnel is provided an open lattice frame 37 (see FIG. 11) which supports the upper run of the conveyor at that point. The frame 37 is mounted on the aforementioned base 18 which is extended beyond the loading end 17' of the tunnel and a pair of transversely spaced bearing carriers 38 are pivoted to the base as at 39, the carriers 38 serving to mount a roll 40 around which the loading end of the conveyor 29 passes. The carriers 38 are adjustable, as by suitable jack screws 41, so that they may rock about the pivots 39 to adjust the tension of the upper run 29' of the conveyor.

The lower run 29" of the conveyor is relatively slack and passes over a plurality of idler rolls 42 rotatably mounted in the lower compartment 17b of the tunnel. The slackness of the lower run of the conveyor permits it to follow a catenary path over the idler rolls, thus assisting to maintain the upper run of the conveyor at the proper tension.

It will be apperciated that the imperforate partition 23 effectively separates the upper compartment 17a of the tunnel with its food carrying run 29' of the conveyor from the lower compartment 17b with its conveyor return run 29". Suitable nozzle means 43 are provided in the upper compartment 17a adjacent the tunnel outlet end 17" for discharging a volatizable, liquefied gas such as liquid nitrogen, for example, into the upper compartment. A plurality of fans 44 are also provided in the upper compartment 17a in advance of the nozzle means 43, these fans being disposed above the conveyor run 29' and driven by suitable motors 45 so as to agitate gas volatilized from the liquified gas and direct the same onto the food on the conveyor run 29' so that the food is quickly frozen during its passage through the tunnel. It will be noted that the fans 44 are of the open blade type and are self-cleaning in that they shed moisture to prevent freezing and accumulation of ice thereon.

Since the volatilized nitrogen gas is heavier than air, it will gravitate in the sloping tunnel downwardly toward the loading end 17' and onto the loading end portion of the conveyor supported by the open lattice frame 37. There, a gas collecting hood 46 is provided under the frame 37, the hood having an outlet duct 47 communicating with the inlet of a blower 48 driven by a motor 49. Thus, the volatilized gas will be drawn through the conveyor and through the lattice frame 37 into the collecting hood 46 and through the duck 47 into the blower 48, being discharged from the latter through the blower outlet 50.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a food freezing apparatus, the combination of an elongated housing forming a tunnel, a longitudinal partition provided in said tunnel and separating the same into an upper compartment and a lower compartment, a food conveyor passing through said tunnel from one end thereof to the other, said conveyor having a loading end, a discharge end, an upper food conveying run passing through said upper compartment along said partition and a lower return run passing through said lower compartment, a plurality of transversely extending rotatable guiding rolls provided at longitudinally spaced points in said lower compartment, the lower run of said conveyor passing in a catenary path over said guiding rolls whereby to maintain appropriate tension on the upper run of the conveyor passing along said partition, and means for discharging volatilizable liquefied gas into said upper compartment, said housing forming said tunnel comprising a plurality of modular sections assembled in end-to-end relationship, said tunnel partition comprising a plurality of planar partition members embodied in the respective tunnel sections, and longitudinally extending wear strips mounted on the upper surface of each partition member, the wear strips on each partition member being laterally offset from and longitudinally overlapping the wear strips on the next adjacent partition member, the upper run of said conveyor riding on said wear strips, together with fixed fastener means securing one end of each of said wear strips at a fixed point to its associated partition member, and self-adjusting fastener means securing the other end of each wear strip to the partition member so as to permit longitudinal expansion and contraction of the wear strip under changes in temperature independently of the associated partition member.

2. In a food freezing apparatus, the combination of an elongated housing forming a tunnel, a longitudinal partition provided in said tunnel and separating the same into an upper compartment and a lower compartment, a food conveyor passing through said tunnel from one end thereof to the other, said conveyor having a loading end, a discharge end, an upper food conveying run passing through said upper compartment along said partition and a lower run passing through said lower compartment, a plurality of transversely extending rotatable guiding rolls provided at longitudinally spaced points in said lower compartment, the lower run of said conveyor passing in a catenary path over said guiding rolls whereby to maintain appropriate tension on the upper run of the conveyor passing along said partition, and means for discharging volatilizable liquefied gas into said upper compartment, together with longitudinally and laterally expansible and contractible lattice-type framework provided in said tunnel and supporting said partition therein, said framework comprising sets of brackets provided at opposite sides of said tunnel, a plurality of framework cross members slidably mounted at the ends thereof on said brackets, a plurality of clips carried by intermediate portions of said cross members, and a plurality of longitudinal framework members slidably mounted on said clips and extending between said cross members, said cross members and said longitudinal members of said framework being independently and individually expansible and contractible under changes in temperature.

3. The apparatus as defined in claim 2 wherein said cross members and said longitudinal members of said framework consist of inverted channels.

4. In a food freezing apparatus, the combination of an elongated housing comprising a plurality of modular sections assembled in end-to-end relationship and forming a tunnel, a longitudinal partition provided in said tunnel and separating the same into an upper compartment and a lower compartment, said tunnel partition comprising a plurality of planar partition members embodied in the respective tunnel sections, means for discharging volatilizable liquefied gas into said upper compartment, an endless conveyor having a food conveying run passing through said upper compartment along said partition, longitudinally extending wear strips mounted on the upper surface of each partition member, the wear strips on each partition member being laterally offset from and longitudinally overlapping the wear strips on the next adjacent partition member, fixed fastener means securing one end of each of said wear strips at a fixed point to its associated partition member, and self-adjusting fastener means securing the other end of each wear strip to the partition member so as to permit longitudinal expansion and contraction of the wear strip under changes in temperature independently of the associated partition member, said food conveying run of said conveyor riding on said wear strips.

5. In a food freezing apparatus, the combination of an elongated housing forming a tunnel, a longitudinal partition provided in said tunnel and separating the same into an upper compartment and a lower compartment, means for discharging volatilizable liquefied gas into said upper compartment, an endless conveyor having a food conveying run passing through said upper compartment along said partition, and a longitudinally and laterally expansible and contractible lattice-type framework provided in said tunnel and supporting said partition therein, said framework comprising sets of brackets provided at opposite sides of said tunnel, a plurality of framework cross members slidably mounted at the ends thereof on said brackets, a plurality of clips carried by intermediate portions of said cross members, and a plurality of longitudinal framework members slidably mounted on said clips and extending between said cross members, said cross members and said longitudinal members of said framework being independently and individually expansible and contractible under changes in temperature.

6. The apparatus as defined in claim 5 wherein said cross members and said longitudinal members of said framework consist of inverted channels.

7. In a food freezing apparatus, the combination of an elongated housing forming a tunnel, a longitudinal partition provided in said tunnel and separating the same into an upper compartment and a lower compartment, means for discharging volatilizable liquefied gas into said upper compartment, an endless conveyor having a food conveying run passing through said upper compartment along said partition, and a longitudinally and laterally expansible and contractible lattice-type framework provided in said tunnel and supporting said partition therein, said framework comprising a plurality of cross members, means slidably mounting ends of said cross members at opposite sides of said tunnel, a plurality of longitudinal members extending between said cross members, and means slidably mounting ends of said longitudinal members to said cross members, said cross members and said longitudinal members being independently and individually expansible and contractible under changes in temperature.

References Cited by the Examiner

UNITED STATES PATENTS

| | | | |
|---|---|---|---|
| 1,583,046 | 5/1926 | Ingle | 198—194 X |
| 1,825,107 | 9/1931 | Wean | 198—194 X |
| 2,447,249 | 8/1948 | Hill | 62—63 |
| 2,464,356 | 3/1949 | Stearns | 165—81 X |
| 2,747,725 | 5/1956 | Hatch et al. | 198—195 |
| 2,895,593 | 7/1959 | McKnight et al. | 198—184 X |
| 2,969,870 | 1/1961 | Pulver | 198—195 |
| 3,027,728 | 4/1962 | Greer et al. | 62—380 X |
| 3,214,928 | 11/1965 | Oberdorfer | 62—63 |

ROBERT A. O'LEARY, *Primary Examiner.*

W. E. WAYNER, *Assistant Examiner.*